(12) United States Patent
Carlier et al.

(10) Patent No.: US 9,302,433 B2
(45) Date of Patent: Apr. 5, 2016

(54) METHOD AND APPARATUS FOR MOULDING PARTS MADE FROM COMPOSITE MATERIALS

(75) Inventors: Veronique Carlier, Biesme-sous-thuin (BE); Andre Bertin, Vedrin (BE); Mikhael Vandeuren, Tongrinne (BE)

(73) Assignee: COEXPAIR, Namur (BE)

( * ) Notice: Subject to any disclaimer, the term of this patent is extended or adjusted under 35 U.S.C. 154(b) by 772 days.

(21) Appl. No.: 13/640,692

(22) PCT Filed: Apr. 15, 2011

(86) PCT No.: PCT/EP2011/056063
§ 371 (c)(1),
(2), (4) Date: May 28, 2013

(87) PCT Pub. No.: WO2011/128453
PCT Pub. Date: Oct. 20, 2011

(65) Prior Publication Data
US 2013/0234353 A1    Sep. 12, 2013

(30) Foreign Application Priority Data

Apr. 15, 2010  (BE) .................................. 2010/0244

(51) Int. Cl.
B29C 70/44     (2006.01)
B29C 70/34     (2006.01)
B29C 45/00     (2006.01)
B29C 70/46     (2006.01)

(52) U.S. Cl.
CPC ........... B29C 70/342 (2013.01); B29C 45/0005 (2013.01); B29C 70/44 (2013.01); B29C 70/46 (2013.01)

(58) Field of Classification Search
CPC   B29C 70/342; B29C 70/44; B29C 2043/562; B29C 2043/563
See application file for complete search history.

(56) References Cited

U.S. PATENT DOCUMENTS

| 4,076,788 A | * | 2/1978 | Ditto ................... B29C 37/0028 264/246 |
| 4,668,460 A | * | 5/1987 | Ongena ............... B29C 37/0028 264/255 |
| 4,781,876 A | * | 11/1988 | Kia ......................... B29C 43/18 264/259 |
| 4,810,444 A | * | 3/1989 | Alberino ............. B29C 33/0055 264/102 |
| 4,963,396 A | * | 10/1990 | Ito ......................... C04B 35/521 427/294 |
| 5,023,041 A | * | 6/1991 | Jones .................. B29C 33/0055 164/80 |

(Continued)

FOREIGN PATENT DOCUMENTS

| EP | 0 495 276 A1 | 7/1992 |
| JP | 60-040232 A | 3/1985 |
| WO | 2010/019697 A1 | 2/2010 |

OTHER PUBLICATIONS

English translation of JP60040232 (Nov. 2015), 13 pages.*

(Continued)

*Primary Examiner* — Matthew Daniels
(74) *Attorney, Agent, or Firm* — Sughrue Mion, PLLC

(57) ABSTRACT

The invention concerns a method of molding a part (1') made from composite material. This method comprises a step of injecting a liquid (7) under pressure into a closed mold (2) containing a fibrous pre-form (1) previously impregnated with resin. Said liquid (7) comes into contact with the resin but it is substantially inert and immiscible with respect thereto. The invention also concerns an apparatus for carrying out this method.

11 Claims, 3 Drawing Sheets

(56) References Cited

U.S. PATENT DOCUMENTS

| | | | | |
|---|---|---|---|---|
| 5,174,933 A | * | 12/1992 | Toh | B29C 37/0028 264/255 |
| 5,433,915 A | * | 7/1995 | Yamamoto | B29C 33/0055 264/102 |
| 5,698,318 A | * | 12/1997 | Burton et al. | 428/355 EP |
| 6,099,906 A | * | 8/2000 | Palmer | B29C 15/125 427/296 |

OTHER PUBLICATIONS

International Search Report of PCT/EP2011/056063 dated Jan. 4, 2012.

* cited by examiner

METHOD AND APPARATUS FOR MOULDING PARTS MADE FROM COMPOSITE MATERIALS

CROSS REFERENCE TO RELATED APPLICATIONS

This application is a National Stage of International Application No. PCT/EP2011/056063 filed Apr. 15, 2011, claiming priority based on Belgian Patent Application No. 2010/0244 filed Apr. 15, 2010, the contents of all of which are incorporated herein by reference in their entirety.

The present invention relates to a method of moulding a part made from a composite material, and also to an apparatus for moulding parts made from a composite material.

Composite material here means specifically a material comprising a plastic matrix of thermosetting or thermoplastic resin and, in this matrix, reinforcing fibres.

Several methods are known to persons skilled in the art for manufacturing parts made from a composite material. Traditionally, the manufacture of such parts comprises pre-forming followed by moulding.

In pre-forming, the reinforcing fibres, normally provided in the form of strips of unidirectional fibres, fabrics or non-woven textiles, are typically stacked in layers to constitute a laminate with defined geometric form and thickness. This stack can be produced manually or by a machine. According to circumstances, these layers may be impregnated with liquid resin before pre-forming, during pre-forming or after pre-forming.

Several moulding methods have been proposed. One of these methods is moulding using a vacuum envelope. In this moulding method, in order to extract the gaseous components from the resin before it sets, in particular, when it is a thermosetting resin, the stacked fibrous reinforcement impregnated with resin is put under vacuum in a closed envelope. When the resin is thermosetting, the final forming of the part can be carried out in an autoclave, and the latter is therefore subjected to a pressure external to the envelope in order to prevent the appearance of gas bubbles during the curing of the part.

This moulding method has several drawbacks. In particular, it is very much a craft process: it does not permit in-line production (loading into and removal from the oven is necessary). It is expensive to execute on a large scale: autoclaves consume a great deal of energy and require numerous consumables. Moreover, they do not allow the easy production of complex and integrated parts, which leads to the production of elementary parts that must often be adjusted before being integrated during a subsequent assembly operation. Moulding in an autoclave also requires long curing cycles. Finally, autoclaves are very expensive devices.

In order to integrate better the production of parts made from composite materials in mass production lines, other moulding methods have been developed, in particular, a RTM (standing for Resin Transfer Moulding) method. In the RTM method, a dry or lightly impregnated fibrous pre-form (typically 5% by volume binder resin) is introduced into a mould. Next, the resin is injected into the mould after the air and any vapours have been evacuated. This method, in particular, allows the in-line production of parts made from composite materials. Using the RTM method, there is obtained in a closed mould, without recourse to an expensive autoclave, parts requiring only little adjustment and assembly and which can be highly integrated. Moreover, in RTM, the pre-form may be more elaborate. The pre-forms may, for example, be combined with metal elements, or previously cured composites, the latter being able to be coated with a film of adhesive. The subsequent injection of the resin and curing thereof consolidates all these elements in a single very elaborate part.

The RTM method does, however, also have drawbacks. In particular, it may be difficult to ensure complete impregnation of the parts having complex shapes or large size. For this reason, only low-viscosity resins are normally compatible with this method.

Resins have been proposed for producing parts with high impact strength. As these resins comprise additives, such as, fillers, thermoplastic resins, or even nanoparticles, the viscosities thereof are comparatively high, which makes them normally incompatible with the RTM method.

To solve this problem, the company Radius Engineering has developed the SQRTM ("Same Qualified Resin Transfer Moulding") method, described by D Milovitch and Richard Nord, examined by Karel Fisher Mason, in the article "Autoclave quality outside autoclave?", *High-Performance Composites*, March 2006. In this SQRTM method, the pre-form inserted in the mould is already previously impregnated with resin. Thus, once the mould is closed, only a small additional quantity of resin must be injected around the part in order to exert the hydrostatic pressure that is necessary to consolidate the pre-form in the mould and eliminate any gas bubbles that may form during the setting of the resin.

Although this method has clear advantages compared with the conventional RTM method, and even compared with other derived methods, such as, RTM assisted by suction (VARTM, "Vacuum Assisted RTM"), it also has drawbacks. Some of these drawbacks are shared with other RTM methods, in particular, the danger of blocking by hardening of the resin in the pump or the channels injecting resin into the cavity of the mould. Other drawbacks are specific to the SQRTM method. In particular in the aerospace field, it is crucial for the resin to be approved for such use. These resins, formulated for pre-impregnation intended for the autoclave method, are difficult to use since, in the absence of fibres, they are more reactive. The risks of a runaway reaction during SQRTM injection is much higher than with RTM resins.

Other methods of producing parts made from composite material have been proposed, using other means for exerting a hydrostatic pressure on a pre-impregnated pre-form installed in the cavity of a closed mould. In particular, in FR-A-2472968 A, a fluid different from the resin is injected into this cavity. However, in order to protect the pre-form and the resin from this fluid, they are separated from the fluid by a flexible membrane. This complicates handling of the pre-form and maintenance of the mould. In addition, a rupture or leakage of the flexible membrane would have serious consequences for the quality of the parts produced.

In U.S. Pat. No. 5,051,226, a liquid, preferably inert, is employed to compress an impregnated pre-form against a mould. However, the mould is an open mould, and it is also suggested therein protecting the pre-form with a barrier to prevent contamination of the resin. The liquid also has the role of heating the pre-form for curing thereof.

JP-A-60/040,232 describes a method of moulding a hollow fibre reinforced plastic material using a liquid. A hollow cylindrical perform is placed in the mould and a pressurised liquid is introduced into the hollow centre of the pre-form to force it into the mould of a specified form. In this case, the pre-form is of a standard shape and is not related to the shape of the final article that is obtained after moulding.

WO-A-2010/019697 describes a method of forming a resin-composite fibre shell using a flexible member located in a mould. A resin fibre pre-impregnate packet is located in the mould on one side of the flexible member, the mould is closed and fluid is applied on the other side of the flexible member to provide a uniform pressure to the pre-impregnate packet during the moulding process. In this case, the pre-form is shaped to have a contour that is similar to the product produced by the moulding process.

An object of the present invention is to provide a more versatile and less expensive method for moulding parts made from composite material while keeping the advantages of the RTM and SQRTM methods with regard to the quality of the resulting parts.

In accordance with one aspect of the present invention, there is provided a method of moulding a part made from composite material, comprising injecting a liquid under pressure into a closed mould containing a fibrous pre-form previously impregnated with resin, the mould having a contour that closely follows the contour of the pre-form, characterised in that said liquid comes into contact with the resin and is substantially inert and immiscible with respect to said resin.

The use of this liquid therefore makes it possible to exert an isostatic pressure on the resin-impregnated pre-form so as to set it without any substantial risk of contamination of the resin, and this without requiring any physical barrier between the resin and this liquid. The risk of a potentially dangerous exothermic reaction of the injected resin is also eliminated. In addition, as the liquid is immiscible with the resin, it can be re-used once the moulding process is completed thereby saving materials in a production-line arrangement.

By having a mould that has a contour that closely follows the contour of the pre-form, the liquid is not required to provide substantial shaping of the pre-form and is therefore only required to maintain the isostatic pressure and to ensure that no gas bubbles are formed in the part being moulded.

In one embodiment of the present invention that is particular advantageous, the resin may be thermosetting, and the method may also comprise a step of curing the resin during which said liquid is maintained at a curing pressure. In this way, the curing pressure can be exerted on the pre-form isostatically, without an expensive autoclave and without the drawbacks related to the RTM and SQRTM methods, in particular, the risk of blocking of the injection circuit and the restrictions of viscosity of the resin. The isostatic pressure may moreover be maintained beyond gelling of the resin.

Moreover, the use of the liquid also ensures that an isostatic pressure is maintained on a resin-impregnated pre-form during the curing of the resin.

Advantageously, said curing pressure may be at least 500 kPa, in this way, exerting a pressure comparable to that obtained in autoclaves or in RTM methods.

Advantageously, said resin can be cured at at least 100° C., so as to be able to use existing resins already approved for aeronautical applications and where the curing temperature is above 100° C.

Advantageously, said thermosetting resin may have a minimum viscosity of at least 500 cP. Therefore, thermosetting resins having high viscosities making them unsuitable for conventional RTM methods, for example, because of additives or fillers, can be used in the method of the invention.

Advantageously, said thermosetting resin may be an epoxy or bismaleimide (BMI) resin. For example, resins sold under the names HexPly® 8552, HexPly® M21, HexPly® M21E, CYCOM® 977-2, CYCOM® 5250-4 BMI or Toray® 3900-2, and approved for aeronautical applications, could be used in this method.

In another advantageous embodiment of the present invention is to allow the subsequent reuse of the liquid injected into the cavity. For this purpose, a method according to the invention can advantageously comprise, after said curing step, a subsequent step in which said liquid is extracted from the cavity before opening the mould. In an embodiment of apparatus for producing parts made from composite material according to the invention, the circuit for injecting liquid at pressure into the cavity may comprise a reversible pump.

Advantageously, said liquid may have a viscosity of less than 200 cP during the injection step. Thus, injection pipes and orifices of lower calibre than in the SQRTM method can optionally be used. The injection speed for pressuring the part can also be more rapid than with SQRTM resins, thereby, facilitating the moulding of large parts.

Advantageously, said liquid may be a liquid polymer, in particular, with a low molecular mass, such as an olefin, and, in particular, an olefin comprising at least one ethylene homopolymer. They can easily be stored and transported, have a substantially unlimited service life, and are substantially hydrophobic. The penetration of this liquid into the part, if it occurs, should easily be detected by non-destructive tests since it must, through its nature of being non-adhesive to the resin, cause delamination. Its lower thermal conductivity could also enable it to be detected by thermography.

Among olefins, those comprising an ethylene homopolymer are particularly advantageous since this polymer, which has a comparatively narrow molecular mass distribution, has more controlled properties. In this way it is easier to ensure that the liquid or a fraction of this liquid does not start to boil or ignite (flash point) at the high temperatures and under the vacuum levels used.

Advantageously, the liquid may comprise a tracer, such as a dye, to enable the quality control systems to detect any inclusions of this liquid in the resin by simple visual inspection or by microscopic techniques.

In accordance with another aspect of the present invention, there is provided apparatus for moulding parts made from composite material, comprising: a mould able to be closed and to be opened and defining, in the closed position a mould cavity for a fibrous pre-form previously impregnated with resin, the mould having a contour that closely follows the contour of the fibrous pre-form; a degassing circuit; and a liquid-injection circuit for injecting liquid under pressure into the mould cavity; characterised in that said liquid-injection circuit contains a substantially inert liquid immiscible with respect to said resin in said fibrous pre-form.

Details concerning an embodiment of the invention are described below with reference to the drawings.

Figure 1:
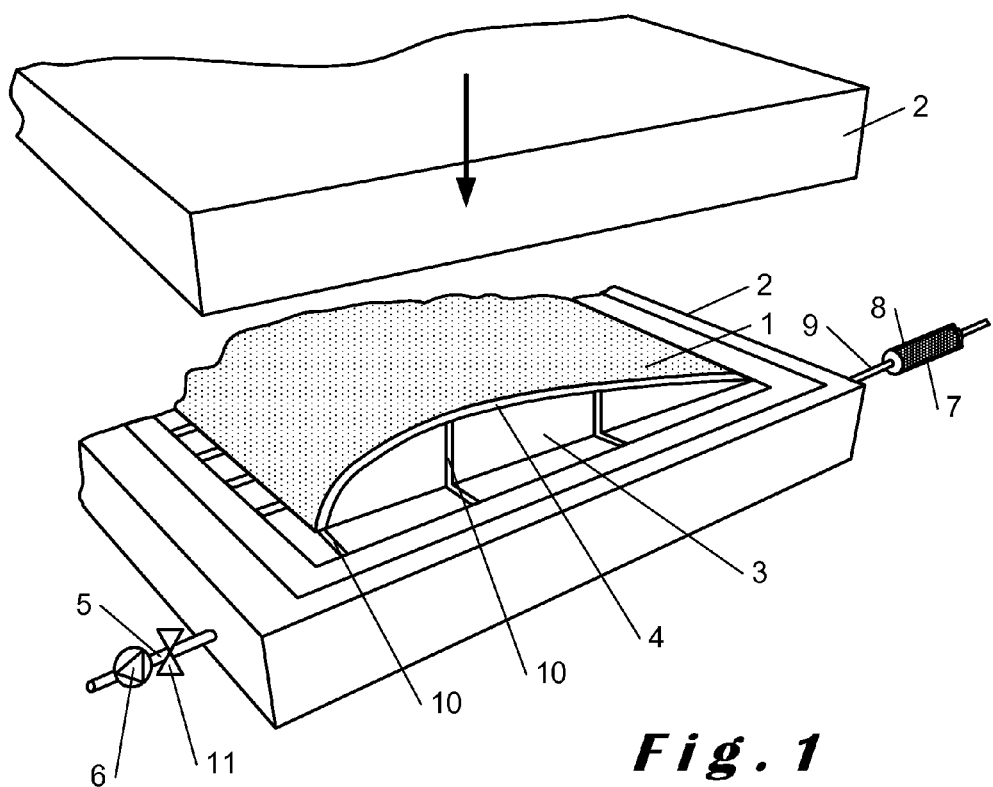
FIG. 1 illustrates a first step of a method according to an embodiment of the invention, in which a fibrous pre-form, previously impregnated with thermosetting resin, is installed in the cavity of a mould.

In a first step of the method illustrated, as can be seen in FIG. 1, a fibrous pre-form 1 of the part to be produced, previously impregnated with a resin, is installed in a cavity 4 of a mould 2 in the open position. The cavity 4 of the mould 2 is contoured to closely follow the contour of the pre-form 1.

In a method or device according to the invention, the pre-form may have been produced by any method known to persons skilled in the art. It may comprise continuous fibres and/or short fibres (non-woven) and these fibres may for example be carbon, glass and/or aramid fibres, among others. The resin impregnating the pre-form may be a high-viscosity thermosetting resin, such as the resin sold under the names HexPly® 8552, HexPly® M21, HexPly® M21E, CYCOM® 977-2, CYCOM® 5250-4 BMI or Toray® 3900-2, or other similar epoxy or bismaleimide resins and which, although having the advantage of very good mechanical strength after curing, are not normally applicable in an RTM method because of their high viscosity, typically above 500 cP.

The mould 2 is preferably a metal mould, for example made from steel, aluminium or an alloy having a low coefficient of thermal expansion, such as $FeNi_{36}$ (Invar®) or other similar iron/nickel alloys. Alternatively, however, a mould made from a composite material could also be used.

The mould 2 also has channels 10 connected to the cavity 4, to a gas-discharge pipe 5 and to a liquid-injection pipe 9. The discharge pipe 5 is connected to an extraction pump 6 and the injection pipe 9 is connected to a piston pump 8 filled with a liquid 7.

In the embodiment illustrated, this liquid is a liquid olefin wax that is inert and immiscible with respect to the resin. It does not boil and does not ignite at the vacuum and pressure levels required by the method. An olefin having a melting point of approximately 90° C. is chosen in the embodiment illustrated so that, although injected in the liquid state into the mould 2, it can be stored and transported in the solid state at ambient temperature. At the injection temperature, however, this liquid olefin 7 may have a low viscosity, typically less than 250 cP and substantially less that that of the resin.

In the example illustrated in FIG. 1, a removable moulding core 3 is introduced into the pre-form 1 to enable a part made from composite material with a complex geometry to be produced. This core 3 also has channels 10 in communication with the pipes 5 and 9. The mould 2 can then be closed, forming a cavity closely following the contours of the pre-form 1. The pre-form 1 is normally impregnated with an excess of resin so that, when the mould 2 is closed, this excess of resin is driven towards the edges of the pre-form 1.

Figure 2:
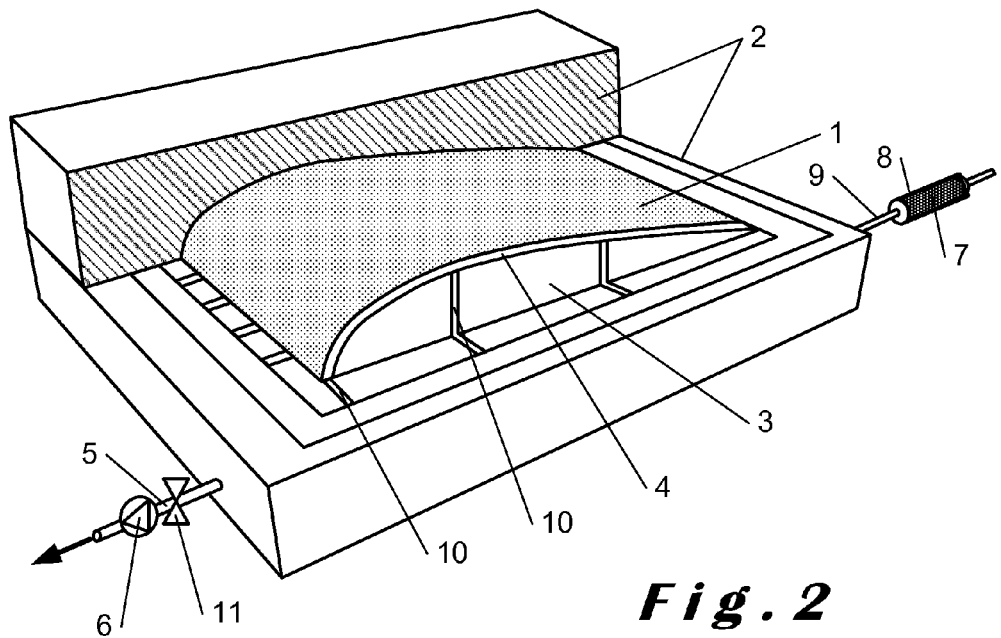
FIG. 2 illustrates a second step, in which the cavity is degassed.

As illustrated in FIG. 2, the gases are then discharged from the mould 2, the pipe 9 and the pump 8 filled with liquid 7 by the extraction pump 6 through the discharge pipe 5 so as to put the whole of the apparatus under vacuum. "Vacuum" means, of course, a substantial negative pressure, not necessarily an absolute vacuum. This negative pressure must, however, make it possible to minimise the quantity and size of any gas bubbles in the liquid 7, in the resin-impregnated pre-form 1 and in the cavity 4, and therefore provide the subsequent porosity of the finished parts.

Figure 3:
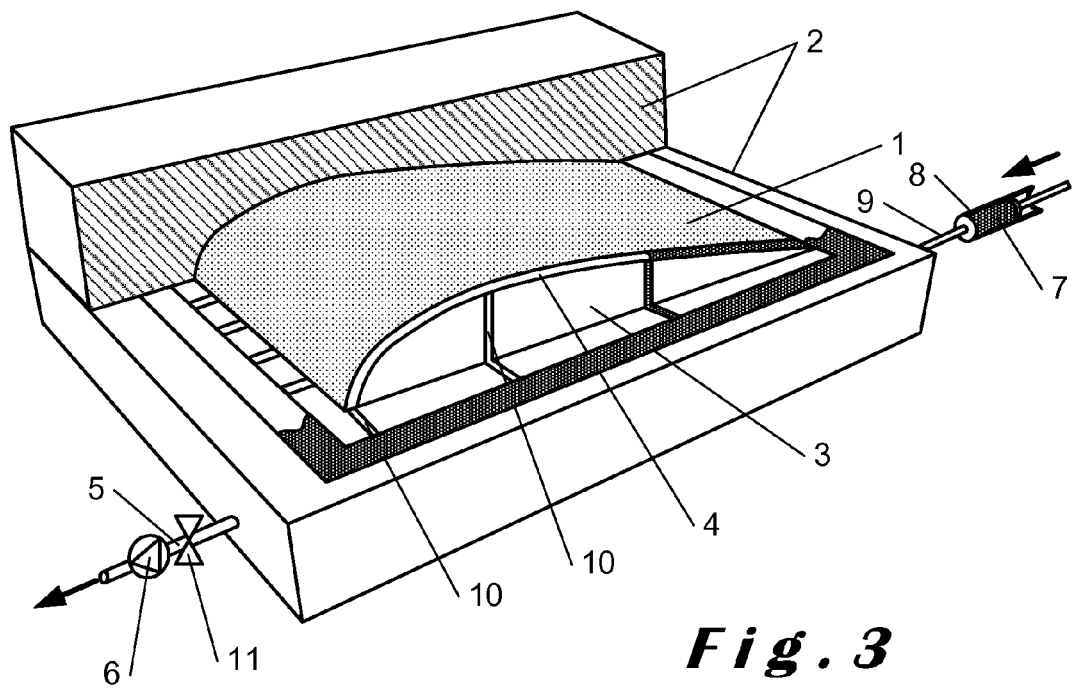
FIG. 3 illustrates a third step, in which a liquid is injected into said cavity.
Figure 4:
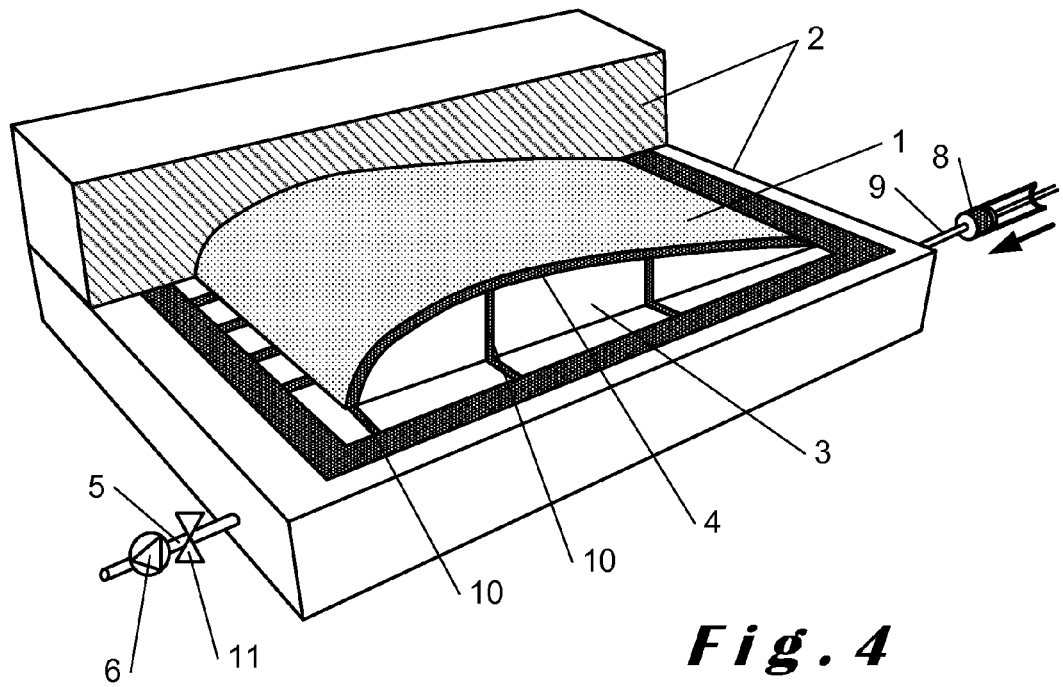
FIG. 4 illustrates a third step of the same method, in which the resin is cured.

The cavity 4 is then heated by heating means (not illustrated) that may include for example an electrical heating device and/or a hot-fluid circuit in order to reach the temperature required for using the chosen resin and curing cycle. These heating devices may be external to the mould 2, such as for example a heating press, or included in the mass of the mould 2. The liquid 7 is then injected under pressure into the mould 2 by the piston pump 8 via the injection pipe 9, as illustrated in FIG. 3, until it comes into contact with the resin of the pre-form 1 through the channels 10, and exerts thereon a hydrostatic pressure as illustrated in FIG. 4. A valve 11 in the pipe 5 is closed when the liquid 7 is detected in the pipe 5.

With the mould 2 filled with liquid 7, the piston pump 8 maintains a pressure of between 500 kPa and 1500 kPa during the resin curing cycle. The high temperatures necessary for this curing are also maintained in the mould 2.

Figure 5:
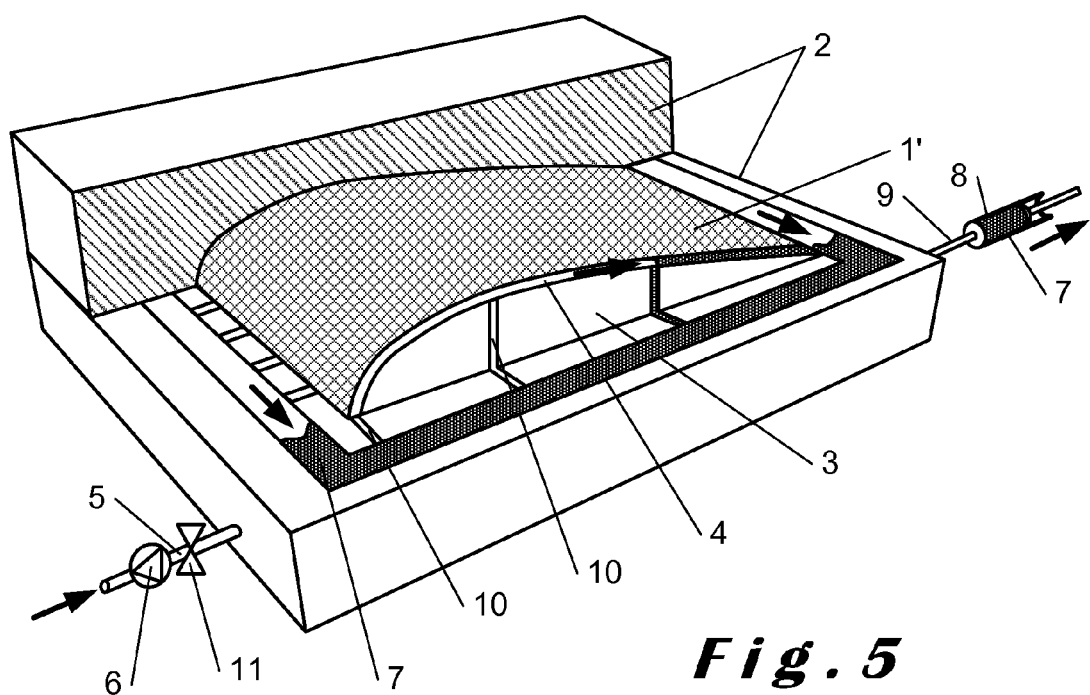
FIG. 5 illustrates a fourth step of the same method, in which the liquid is extracted from the cavity before reopening the mould in order to extract therefrom a part made from composite material.

Once the curing cycle is finished, the piston pump 8 operates in reverse to extract the still liquid olefin from the mould 2 as illustrated in FIG. 5. This will make it possible to reuse this olefin later in subsequent curing. In an alternative embodiment, the liquid olefin could also be discharged from the mould 2 through the pipe 5. Once the liquid olefin is drained from the mould 2, the mould 2 can be reopened in order to extract therefrom the cured part 1' made from composite material.

Although the present invention has been described with reference to specific example embodiments, it is obvious that modifications and changes may be made to these examples without modifying the general scope of the invention as defined by the claims. For example, alternative liquids to olefins may be considered by a person skilled in the art. The method and device of the invention could also be used with resins and fibres other than those specifically cited, as well as other types of pump, such as for example screw pumps. Consequently the description and drawings must be considered in an illustrative rather than restrictive sense.

The invention claimed is:

1. A method of moulding a part made from composite material, comprising:
    placing a fibrous preform impregnated with thermosetting resin in a mould having a contour that closely follows the contour of the preform;
    closing the mould;
    applying vacuum to the preform and to a liquid comprising a liquid polymer that is substantially inert and immiscible with respect to the thermosetting resin;
    injecting the liquid under pressure into the closed mould, the liquid contacting the thermosetting resin;
    curing the resin while the liquid is maintained under pressure; and,
    after said curing, extracting the liquid from the mould and subsequently opening the mould.

2. Moulding method according to claim 1, wherein the liquid pressure during curing is at least 500 kPa.

3. Moulding method according to claim 1, wherein said resin is cured at at least 100° C.

4. Moulding method according to claim 1, wherein said thermosetting resin has a minimum viscosity of at least 500 cP.

5. Moulding method according to claim 1, wherein said thermosetting resin comprises one of an epoxy and bismaleimide resin.

6. Moulding method according to claim 1, wherein said liquid has a viscosity of less than 250 cP during the injection step.

7. Moulding method according to claim 1, wherein said liquid polymer is an olefin.

8. Moulding method according to claim 7, wherein said olefin comprises an ethylene homopolymer.

9. Moulding method according to claim 1, wherein the melting point of said liquid at ambient pressure is less than 100° C.

10. Moulding method according to claim 1, wherein said liquid comprises a tracer.

11. Moulding method according to claim 10, wherein said tracer is a dye.

* * * * *